US009989271B1

(12) United States Patent
Becker

(10) Patent No.: US 9,989,271 B1
(45) Date of Patent: Jun. 5, 2018

(54) AIR CONDITIONING WITH THERMAL STORAGE

(71) Applicant: Calvin Becker, Wiltshire (GB)

(72) Inventor: Calvin Becker, Wiltshire (GB)

(*) Notice: Subject to any disclaimer, the term of this patent is extended or adjusted under 35 U.S.C. 154(b) by 0 days. days.

(21) Appl. No.: 15/676,374

(22) Filed: Aug. 14, 2017

(51) Int. Cl.
F25C 1/00 (2006.01)
F24F 5/00 (2006.01)
F24F 11/00 (2018.01)

(52) U.S. Cl.
CPC .... *F24F 5/0021* (2013.01); *F24F 2005/0025* (2013.01); *F24F 2011/0047* (2013.01)

(58) Field of Classification Search
CPC ............ F24F 5/0021; F24F 2011/0047; F24F 2005/0025
See application file for complete search history.

(56) References Cited

U.S. PATENT DOCUMENTS

| 4,054,980 | A | 10/1977 | Roma |
| 4,124,061 | A | 11/1978 | Mitchell |
| 4,355,627 | A | 10/1982 | Scarlata |
| 4,412,426 | A | 11/1983 | Yuan |
| 5,630,961 | A | 5/1997 | Salee |
| 5,678,626 | A | 10/1997 | Gilles |
| 5,944,089 | A | 8/1999 | Roland |
| 6,101,830 | A * | 8/2000 | Feuerecker ............ B60H 1/005 62/244 |
| 6,178,770 | B1 | 1/2001 | Bradley, Jr. |
| 6,253,567 | B1 | 7/2001 | Imanari et al. |
| 6,324,860 | B1 | 12/2001 | Maeda |
| 6,460,355 | B1 | 10/2002 | Trieskey |
| 7,905,110 | B2 | 3/2011 | Reich |
| 2003/0042321 | A1 | 3/2003 | Tacchi |
| 2003/0015945 | A1 | 8/2003 | Aikawa et al. |
| 2005/0172660 | A1 | 8/2005 | Anderson |
| 2006/0070385 | A1 | 4/2006 | Narayanamurthy |
| 2006/0288727 | A1 | 12/2006 | Aikawa et al. |
| 2007/0209383 | A1 | 9/2007 | Hutton |
| 2009/0173336 | A1 | 7/2009 | Leifer |
| 2009/0180939 | A1 | 7/2009 | Hagen |
| 2009/0211568 | A1 | 8/2009 | Whitaker |

(Continued)

FOREIGN PATENT DOCUMENTS

| DE | 19530609 A1 | 2/1997 |
| EP | 1811236 A2 | 7/2007 |
| EP | 2322879 A2 | 5/2011 |

*Primary Examiner* — Len Tran
*Assistant Examiner* — Ana Vazquez
(74) *Attorney, Agent, or Firm* — Larson & Larson, P.A.; Frank Liebenow

(57) ABSTRACT

An air conditioning system has an air conditioning thermal storage that includes one or more thermal plates. The one or more thermal plates have a first side and a second side separated by a thermally conductive plate (e.g. metal such as aluminum or copper). The first side of each of the one or more thermal plates has a primary input orifice and a primary output orifice. The second side of each of the one or more thermal plates has a secondary input orifice and a secondary output orifice. The first side of each of the one or more thermal plates is fluidly isolated from the second side of each of the one or more thermal plates providing for thermal conduction between such. The thermal plates are at least partially immersed in a material (e.g. antifreeze, vegetable beetroot) for storing cold heat.

19 Claims, 10 Drawing Sheets

(56) References Cited

U.S. PATENT DOCUMENTS

| | | |
|---|---|---|
| 2009/0211727 A1 | 8/2009 | Yin |
| 2009/0301119 A1 | 12/2009 | Chen |
| 2010/0043473 A1 | 2/2010 | Koh et al. |
| 2010/0089080 A1 | 4/2010 | Koh |
| 2010/0314081 A1 | 12/2010 | Reis |
| 2012/0067551 A1 | 3/2012 | Ganapathi |
| 2013/0145780 A1 | 6/2013 | Parsonnet |
| 2013/0228308 A1 | 9/2013 | Abhari |
| 2013/0312437 A1 | 11/2013 | Davies |
| 2014/0165633 A1* | 6/2014 | De Piero .............. B01D 53/265 62/93 |
| 2016/0187013 A1 | 6/2016 | Becker |
| 2016/0187014 A1 | 6/2016 | Becker |

* cited by examiner

AIR CONDITIONING WITH THERMAL STORAGE

FIELD

This invention relates to air conditioners, and more particularly, to a thermal storage air conditioner in which a cold heat is produced and stored in a thermal storage device and later used for cooling a room or refrigerator, etc.

BACKGROUND

Air conditioning systems have been in place for many years. Typically, such systems comprise an outdoor heat exchanger that includes a compressor and evaporator, an expansion device, and an indoor heat exchanger where cooled refrigerant (e.g. liquefied refrigerant) changes phase to a gas, extracting heat from the air within the structure to make such a phase change.

In general, when the temperature within an air conditioned area reaches a predetermined temperature such as a setting on a thermostat, the compressor and air handler energize to cool the air conditioned area, until the temperature within the air conditioned area reaches another predetermined temperature, typically a few degrees below that set by the thermostat. In this way, an amount of hysteresis is provided to reduce start/stop cycles of the compressor and air handler, providing improved efficiency, operating life, and user experience.

Although there are many factors that affect efficiency and cost of operation, a few factors are considered here within. One factor that affects cost is the overall cost of electricity used in operating the compressor and air handler. These devices are motor-driven and typically consume many kilowatt hours per day. In some parts of the world, electricity prices are tiered, in that, during business hours (e.g. when businesses consume the most energy), the electricity rates are higher than during the hours that many businesses are closed and most people are sleeping. This presents an advantage in operating the air conditioning during these off-peak hours, but unfortunately, with conventional air conditioning systems, this would result in the air conditioned areas becoming too cold during the evening and too warm during the day.

Another factor that needs consideration is temperature differential between the area being air conditioned and the outside ambient air. For example, when cooling an air conditioned area, the higher the ambient air temperature, the more the compressor needs to work to compress the refrigerant, and therefore, the more energy consumption. Generally, at night, the ambient air temperature cools, but the same situation occurs as above, in that, it is not practical to reduce the temperature in the air conditioned area below a certain temperature.

Being that the compressor usually consumes a major portion of the overall electricity budget and the compressor will operate more efficiently when outside ambient air is lowest, there are many advantages to operating the compressor during off-peak hours (e.g. at night), but to do so, an efficient way to store the cold heat is needed that does not require the compressor to run during peak (warmer) hours.

Prior systems utilizing thermal storage required the compressor operate to access the cold heat stored in the thermal storage. Further, such systems generally store cold heat (e.g. extract heat) in a fluid by decreasing the temperature of the fluid which has limited efficiency.

What is needed is a system that will efficiently store cold heat and retrieve the cold heat when conditions indicate a need to do such.

SUMMARY

In one embodiment, an air conditioning system is disclosed including a compressor and an outside air handler that is in fluid communications with the compressor. The air conditioning system includes a thermal storage that has one or more thermal plates. The thermal plates have a first side and a second side (separated by a thermally conductive plate). A primary input orifice of the first side of thermal plates is in fluid communications with the outside air handler and primary output orifice of the first side of thermal plates is in fluid communications with the compressor. The air conditioning system includes an inside air handler that has an input and an output and a fluid pump that has an pump input and a pump output, the pump input is in fluid communications with a secondary output orifice of the second side of thermal plates and the pump output is in fluid communications with the input of the inside air handler. The output of the inside air handler is in fluid communications with a secondary input orifice of the second side of thermal plates. When the compressor runs, a first refrigerant is compressed into a liquid, cooled by the outside air handler and flows into the primary input orifice of the first side of thermal plates where the first refrigerant evaporates, extracting heat from a material within the thermal storage and the evaporated refrigerant returns to the compressor. When cooling is needed, the pump operates and circulates a second refrigerant from the secondary output orifice of the second side of thermal plates into the inside air handler where the refrigerant extracts heat as it evaporates into a gas and the refrigerant in gaseous form returns to the thermal storage where the refrigerant condenses back into a cold liquid.

In another embodiment, a method of cooling is disclosed including cooling and compressing a first refrigerant into a liquid state using a compressor and outside air handler and flowing the first refrigerant in the liquid state through an input orifice of a first side of one or more thermal plates. The first side of one or more thermal plates is thermally interfaced to and separated from a second side of one or more thermal plates by a sheet of metal. The thermal plate(s) are situated within a thermal storage that is at least partially filled with a material. A primary input orifice of the first side of thermal plates is in fluid communications with the outside air handler and primary output orifice of the first side of thermal plates is in fluid communications with the compressor. Heat is extracted from the material by the first refrigerant as the first refrigerant changes state from the liquid into a gas within the first side of the thermal plate(s). The first refrigerant, in gaseous form, exits the first side of the thermal plate(s) through a primary output orifice of the first side of thermal plates for returning to the compressor. A second refrigerant flows through the inside air handler where the second refrigerant in liquid form extracts heat from air flowing through the inside air handler, thereby evaporating. The second refrigerant, after evaporation, flows into the second side of the thermal plate(s) through a secondary input orifice and the second refrigerant cools within the second side of the thermal plates then the second refrigerant exits the second side of the thermal plate(s) through a secondary exit orifice for returning to the inside air handler.

In another embodiment, an air conditioning thermal storage is disclosed including one or more thermal plates. The one or more thermal plates have a first side and a second side. The first side of each of the one or more thermal plates has a primary input orifice and a primary output orifice. The second side of each of the one or more thermal plates has a secondary input orifice and a secondary output orifice. The first side of each of the one or more thermal plates is fluidly isolated from the second side of each of the one or more thermal plates (e.g. by a metal plate), which also provides for thermal conduction between the first side of each of the one or more thermal plates and the second side of each of the one or more thermal plates.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
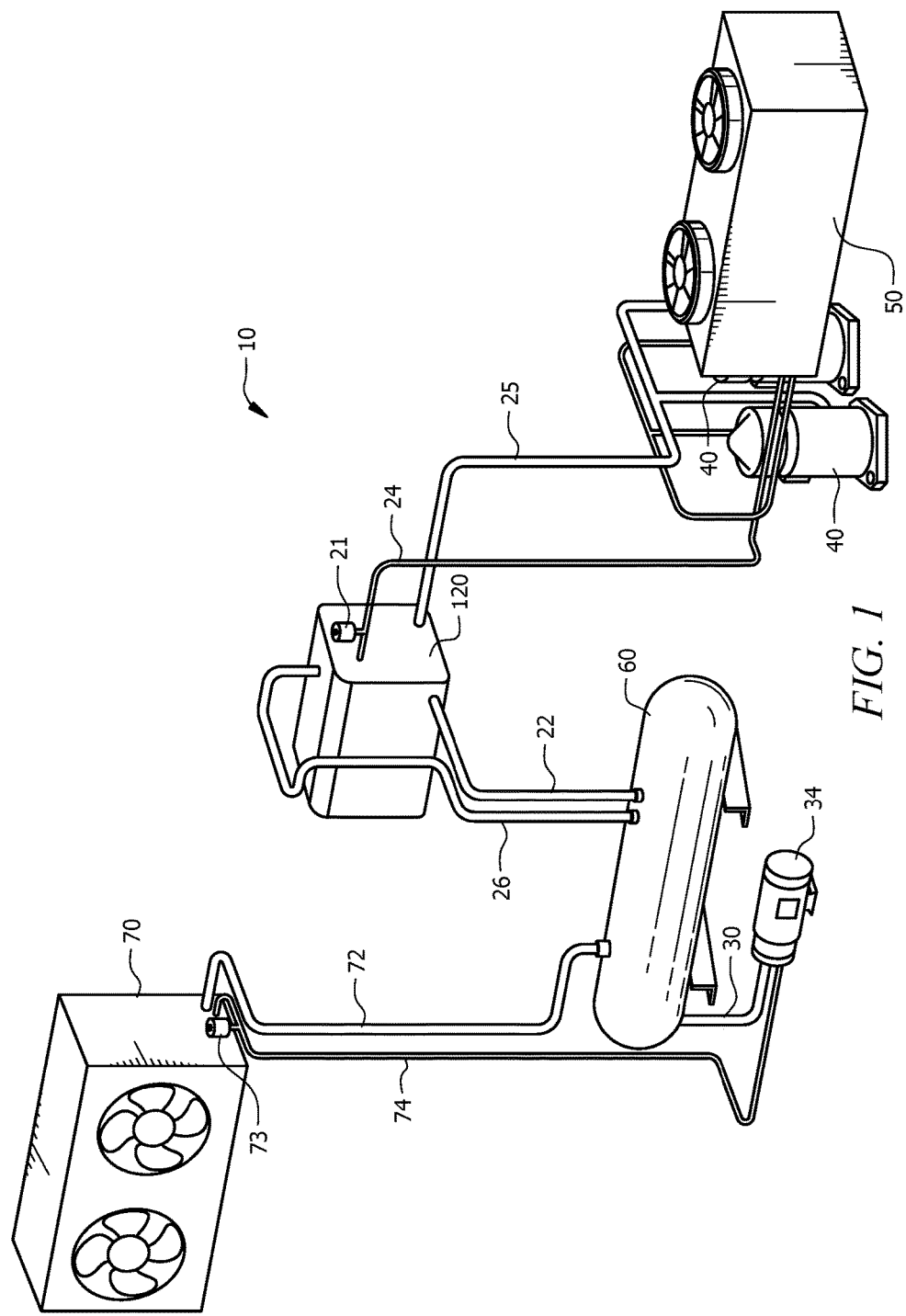
FIG. 1 illustrates a perspective view of an air conditioning system with thermal storage.

Reference will now be made in detail to the presently preferred embodiments of the invention, examples of which are illustrated in the accompanying drawings. Throughout the following detailed description, the same reference numerals refer to the same elements in all figures.

Note that throughout this description, an air conditioning system is described. In such, an air conditioning system is any system that conditions air with a temperature change, either making the air cooler (traditional) or warmer (reversed system). There is no limitation on the location of the air being conditioned such as within a building or room, within a chiller or "refrigerator," within a passenger compartment of a vehicle, within a cargo section of a tractor trailer or train, etc.

The system described provides air conditioning in any such scenario with the added benefit of performing extra work (e.g. drawing extra energy or electricity) during certain time periods to reduce the amount of work (e.g. drawing less energy or electricity) during other time periods. This is very useful in locations that have tiered energy costs (e.g., lower costs during evening hours), but also is very useful in locations that have constant energy costs but potentially changing outside ambient air temperatures (and/or humidity). For example, even in a location with constant energy costs, it is advantageous to operate the high energy consumption component (e.g. compressor) during the evening hours when the outside temperature is the coldest and then saving the cool heat in a storage cell for use during the daytime hours when the outside temperature is the warmest which requires more energy by the compressor to cool the target area. Likewise, in a vehicle, there are times when energy (e.g. from the fossil-fuel engine) is wasted such as while waiting for a traffic light, while there are times when very little surplus energy is available for cooling such as while accelerating or climbing a hill. There are many advantages in storing cool heat (e.g. running the compressor) while idling and utilizing the stored cool heat (without running the compressor) when other demands are made upon the vehicle's engine.

Although the air conditioning system describe is shown with an outside air heat exchanger 50 (see FIGS. 1-2), any known condensing system is anticipated including, for example, water-based in which water is circulated over the fins to cool the refrigerant (instead of air), or heat-pump systems which rely on the temperatures beneath the surface to cool the refrigerant.

Figure 2:
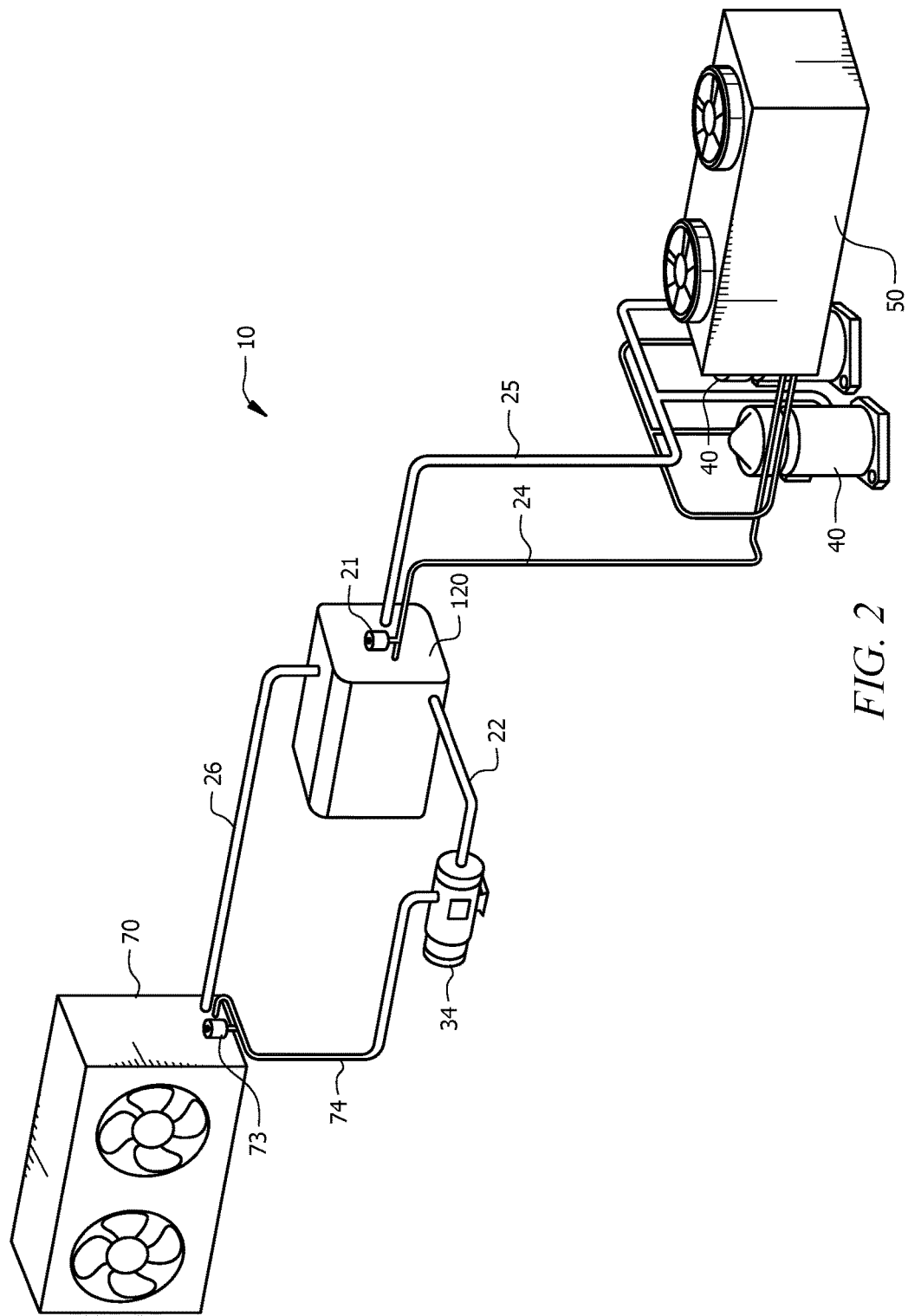
FIG. 2 illustrates a second perspective view of the air conditioning system with thermal storage.
Figure 3:
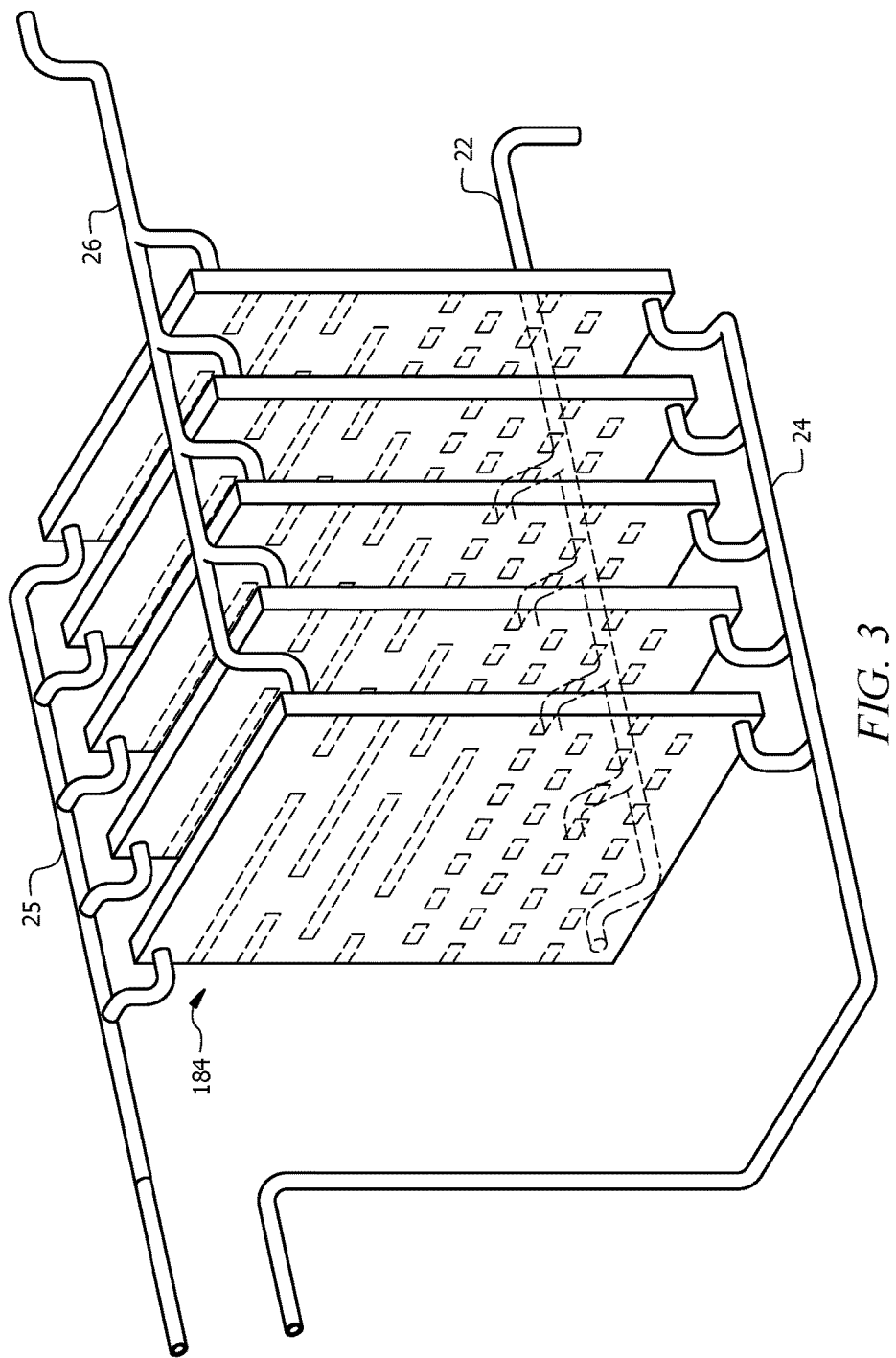
FIG. 3 illustrates a perspective view of the internal plate system of the thermal storage arrangement.
Figure 4:
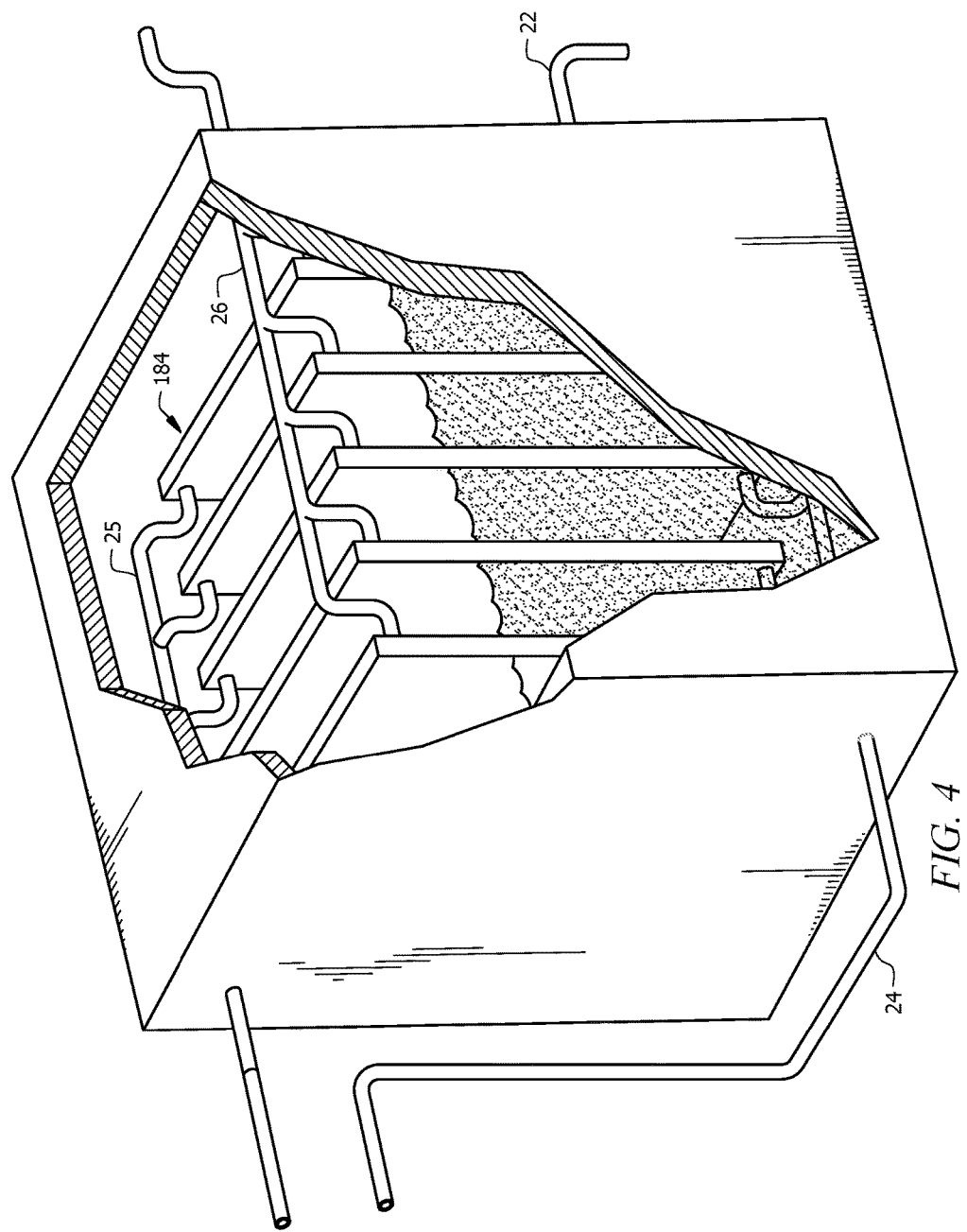
FIG. 4 illustrates a perspective view of the thermal storage.
Figure 5:
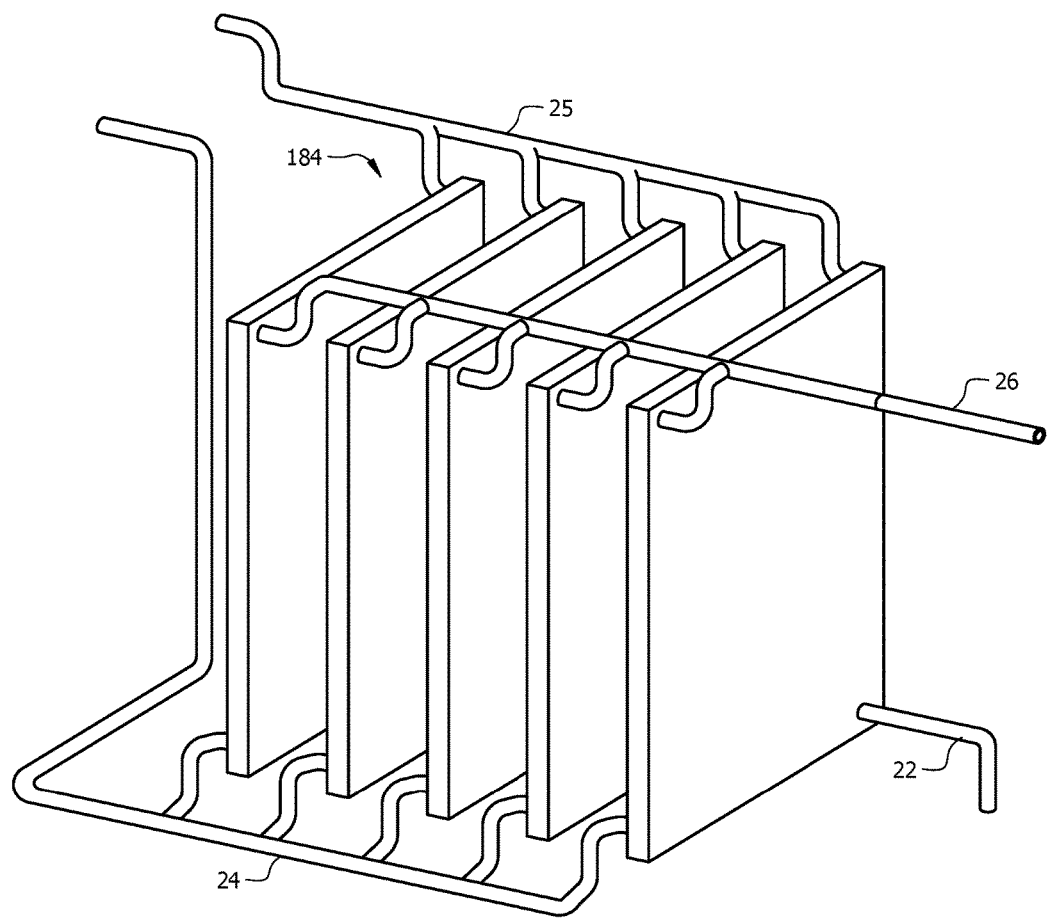
FIG. 5 illustrates a second perspective view of the internal plate system of the thermal storage arrangement.

Referring to FIGS. 1 and 2, perspective views of an air conditioning system 10 with thermal storage 120 are shown. Some of the components of the air conditioning system 10 are similar to components of a conventional air conditioning system, but are used in a different manner with the thermal storage 120.

In the air conditioning system 10 with thermal storage 120, the thermal storage 120 has thermal plates 184 (see FIGS. 3-6) for transferring cold heat to/from a refrigerant there within. A first side of the thermal plates 184 receives and flows refrigerant to/from the compressor(s) 40 and a second side of the thermal plates 184 receives and flows a second refrigerant/liquid to/from the inside air handler 70. In this way, two independent types and chemistries are allowed, though in some embodiments, the refrigerant flowing through first side of the thermal plates 184 is the same fluid that flows through the second side of the thermal plates 184.

The air conditioning system 10 includes thermal storage 120 that will be further described with FIGS. 3-6. The air conditioning system 10 includes one or more typical compressors 40 (two are shown as an example), typically driven by an electric motor for home and office, but there is no limitation to the type of compressor(s) 40 and the way the compressor(s) 40 is/are driven (e.g., by a gasoline engine, battery, solar power). The compressor(s) 40 have a low pressure suction line (vapor inlet line) 25 through which warm, gaseous refrigerant is received from the thermal storage 120. The compressors 40 then compress this gaseous refrigerant into a liquid state at a high pressure which is then passed through the outside air heat exchanger 50 where the liquid refrigerant is cooled by a flow of outside air over a series of fins (not shown), as known in the industry. The now cold, liquid refrigerant, under pressure, flows through the high pressure line 24 to the thermal storage 120. As the cold, liquid refrigerant flows through the first side of the thermal plates 184 within the thermal storage 120, the refrigerant changes state from a liquid to a gas (evaporates), extracting heat (thermal energy) from the material 90 (see FIGS. 7 and 8) within the thermal storage 120, lowering the temperature of the material 90. At a certain temperature (freezing point of the material 90 based upon the physical properties of the material 90), the material 90 changes phase from a liquid to a solid. This phase change requires cooling energy above that needed to simply lower the temperature of the material 90, and therefore, stores that additional energy until the now solid material 90 warms above a certain temperature (melting point based upon the physical properties of the material 90). For completeness, an optional thermal expansion valve 21 is shown which is anticipated to be any known device including a standard expansion valve, an electronic expansion valve, a hand expansion valve, a capillary tube, etc.

Note that many typical components of a traditional air conditioning compressor 40 and outside air heat exchanger 50 such as reversing valves, thermal expansion devices, check valves, fans/motors to flow air over the fins, fins, etc., are not shown for clarity purposes as they are well known in the art.

An inside air handler 70 (coils, fins, motors, etc., not shown for clarity reasons) is located in the structure to be cooled such as in a living space, freezer compartment, refrigerator, vehicle passenger compartment, etc. The inside air handler 70 is similar or the same as such known in the industry.

In the examples shown, a first refrigerant flows through the compressor 40, outside air handler 50, and a first side of the thermal plates 184 and a second refrigerant flows through the inside air handler 70, the pump 34, optionally the storage tank 60, and a second side of the thermal plates 184 within the thermal storage 120. Although this arrangement provides for the first refrigerant to be different from the second refrigerant, in some embodiments, the first refrigerant is the same as the second refrigerant.

In the example of FIG. 1, the compressor 40 is operated at a time desired (e.g. when electricity rates are lower) until the material 90 within the thermal storage 120 achieves the desired temperature. While the compressor 40 runs, cold first refrigerant from the compressor 40 and outside air handler 50 flows through the first side of the thermal plates 184 within the thermal storage 120 and cools and/or freezes the material 90 within the thermal storage 120. Once the desired temperature of the material 90 within the thermal storage 120 is achieved, the compressor 40 is stopped, requiring little or no further power.

Now, as the second refrigerant in gaseous form enters the thermal storage 120 from a second low pressure line 26, the second refrigerant passes through the second side of the thermal plates 184, the second refrigerant contacts is cooled and condenses into a liquid. The condensed, cold liquefied second refrigerant flows through high pressure line 22 into a storage tank 60 (preferably insulated storage tank or a Liquid Refrigerant Receiver as known in the industry). As any of the second refrigerants within the storage tank 60 evaporate, the gaseous second refrigerant flows through the second low pressure line 26 into the thermal storage 120 where is it then condensed as described above.

The liquefied second refrigerant within the storage tank 60 is in fluid communications with a pump 34 through a second tube 30. When cooling is required within the structure as determined by, for example, a thermostat or other temperature sensing device, the condensed, liquefied second refrigerant from the storage tank 60 is pumped into the inside air handler 70 through a high pressure line 74 and optionally, a thermal expansion valve 73 which is anticipated to be any known device including a standard expansion valve, an electronic expansion valve, a hand expansion valve, a capillary tube, etc. The inside air handler 70 receives the cooled, liquid second refrigerant through the high pressure line 74 and the liquid second refrigerant evaporates (changes state to a gas refrigerant) within the coils or simply cools the coils of the inside air handler 70, extracting heat from air flowing through the inside air handler 70. The now gaseous (or warm liquid) second refrigerant exits the inside air handler 70 through a second suction line 72 and returns to the storage tank 60, and eventually to the thermal storage 120 where it is again cooled and liquefied.

As the temperature of the material 90 within the thermal storage 120 rises, determinations are made as to whether the compressor 40 should be run. For example, if the outside air temperature is at an ideal temperature or if electricity rates are low, the compressor is run to cool the material 90 to the desired temperature. If the conditions are not right (e.g. electricity rates are high or outside air temperatures are not ideal), running of the compressor 40 is suppressed until cooling is no longer possible with the remaining cold heat energy stored in the thermal storage 120.

In the example of FIG. 2, the compressor 40 is operated as in FIG. 1, at a time desired (e.g. when electricity rates are lower) until the material 90 within the thermal storage 120 achieves the desired temperature. While the compressor 40 runs, a first refrigerant from the compressor 40 and outside air handler 50 flows through the first side of the thermal plates 184 within the thermal storage 120 and cools and/or freezes the material 90 within the thermal storage 120. Once the desired temperature of the material 90 within the thermal storage 120 is achieved, the compressor 40 is stopped, requiring little or no further power.

Now, as the second refrigerant (e.g. in gaseous form) enters the thermal storage 120, the second refrigerant contacts the cold second side of the thermal plates 184 and cools and/or condenses into a liquid form of the second refrigerant.

When cooling is required within the structure as determined by, for example, a thermostat or other temperature sensing device, the condensed, liquefied second refrigerant from the thermal storage 120 is pumped into the inside air handler 70 through a high pressure line 74. The inside air handler 70 receives the cooled, liquid second refrigerant through the high pressure line 74 and the liquid second refrigerant evaporates (changes state to a gas refrigerant) within the coils of the inside air handler 70, extracting heat from air flowing through the inside air handler 70 to provide cool air within the structure (e.g., home, office, refrigerator). The now gaseous second refrigerant exits the inside air handler 70 through a second suction line 72 and returns to the thermal storage 120 where it is again cooled and liquefied.

Again, as the temperature of the material 90 within the thermal storage 120 rises, determinations are made as to whether the compressor 40 should be run. For example, if the outside air temperature is at an ideal temperature or if electricity rates are low, the compressor is run to cool the material 90 to the desired temperature. If the conditions are not right (e.g. electricity rates are high or outside air temperatures are not ideal), running of the compressor 40 is suppressed until cooling is no longer possible with the remaining cold heat energy stored in the thermal storage 120. For example, when outdoor temperatures are 23 C or below, the compressor 40 and fans will operate, cooling the material 90 to, for example, the freezing point of the material 90. During this time, the pump 34 will operate as needed to maintain the desired temperature within the structure. Any surplus cooling due to lower ambient outside temperatures will be stored in the thermal storage 120. As the outside temperature increases above 23 C, the system will favour extracting cold heat from the thermal storage 120 by operating only the pump 34 until the temperature within the thermal storage 120 increases to a point at which the compressor(s) 40 need be operated.

In a preferred embodiment, the pump 34 is an LPA (Liquid Pressure Amplification) pump. Although a single thermal storage 120 is shown in FIGS. 1 and 2, smaller, larger, serial and/or parallel units of thermal storage 120 are anticipated.

In some embodiments, the material 90 within the thermal storage is a chemical-based antifreeze material such as ethylene glycol or a mixture of such antifreeze and water for achieving the desired phase change temperature (e.g., freezing point). In some embodiments, the material 90 is made of a non-global warming fluid that is processed from the vegetable beetroot. There is no limitation to the material 90. By way of the plate structure of the thermal plates 184, efficient thermal transfer will occur between first side of the thermal plates 184 and second side of the thermal plates 184 even in absence of the material 90.

By varying the antifreeze concentration level of the material 90, the antifreeze eutectic freezing temperature is set as desired. For example, a higher eutectic freezing temperature is used in air conditioning for chilling in the range of 25 F to 30 F, while a medium eutectic freezing temperature is used in air conditioning for chilling in refrigerators in the range of 15 to 20 F as needed for fresh meats, dairy products, and a low eutectic freezing temperature is used in air conditioning for chilling in refrigerators in the range of 35 F to −18 F, typically in freezers for frozen meats, fish, poultry, etc.

It is fully anticipated that the first refrigerant be the same or different to the second refrigerant and either refrigerant is any know refrigerant in the industry. As a first example, the first refrigerant is propane or ammonia ($Nh_3$) and the second refrigerant is $Co_2$ fluid (R-744). As a second example, both the first refrigerant and second refrigerant is $Co_2$ fluid (R-744).

Figure 6:
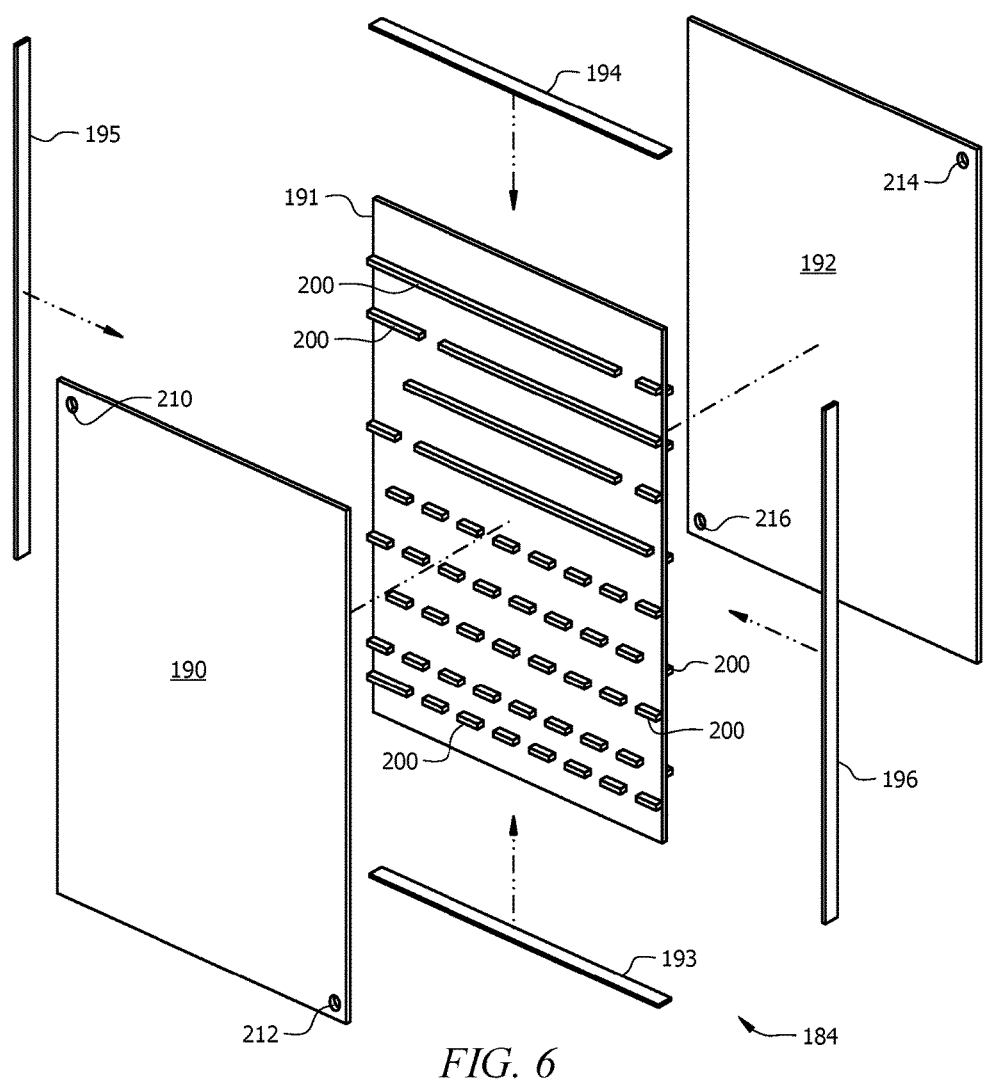
FIG. 6 illustrates an exploded view of a single internal plate of the thermal storage arrangement.

Referring to FIGS. 3-6, perspective views of the internals of the thermal storage 120 are shown. Within the thermal storage 120, there are a series of thermal plates 184 having first side and a second side. An example of the construction of such first side of the thermal plates 184 are shown in FIG. 6.

At a lower end of the first side of the thermal plates 184 (lower with respect to gravity) is a high pressure line 24 through which, cool liquid refrigerant is collected from the first side of the thermal plates 184 through forces of gravity.

The volume of thermal battery is determined by application, for example, in some embodiments, the volume is one square meter.

The first side of the thermal plates 184 are separated from the second side of the thermal plates 184 by a separation sheet 191 of thermally conductive material (e.g. aluminum, stainless steel, etc.) providing efficient heat transfer between the first side of the thermal plates 184 and the second side of the thermal plates 184. By thermally interfacing the first side of the thermal plates 184 with the second side of the thermal plates 184, cool heat flows readily between the two as well as into the material 90 within the thermal storage 120.

The material 90 is contained within an outer shell 92 that, preferably, includes a good thermal insulator. It is also preferred that the outer shell 92 be water tight so the material 90 does not exit and, for when materials 90 expand and contract, it is also preferred that the outer shell 92 be structurally sound as to not break under pressure of the material 90. It is anticipated that in some embodiments, the outer shell 92 be a set of layers of sealing materials, thermally insulating materials, and/or structural materials in any order, composition, and combination.

Within the thermal storage 120, are a series of one or more thermal plates 184, each having a first side separated from the second side by the separation sheet 191. The first refrigerant enters the first side of the thermal plates 184 through a primary input orifice 212 at a lower end of the first side of the thermal plates 184 (lower by gravity) from the high pressure line 24. The cool liquid first refrigerant is distributed across the surface of the separation sheet 191 by a plurality of spacers 200. The spacers 200 are preferably of varying size and have offset placement so as to force the liquid first refrigerant to traverse a majority of the separation sheet 191 as the liquid first refrigerant (or gaseous refrigerant) approaches the primary output orifice 210. The primary output orifice 210 is interfaced to the suction tube 25 for return of the first refrigerant to the compressor(s) 40.

Likewise, the second refrigerant exits the second side of the thermal plates 184 through a secondary output orifice 216 at a lower end of the second side of the thermal plates 184 (lower by gravity) to the high pressure line 22 that is in fluid communication with the pump 34. The cool liquid second refrigerant is delivered to the inside air handler 70 for cooling a structure or refrigeration unit. As the second refrigerant returns from the inside air handler 70 (e.g. in gaseous form), the second refrigerant enters the second side of the thermal plates 184 through a secondary input orifice 214. The, now warm second refrigerant is distributed across the surface of the separation sheet 191 by a plurality of spacers 200. The spacers 200 are preferably of varying size and offset placement so as to force the second refrigerant to traverse a majority of the separation sheet 191 as the liquid refrigerant (or gaseous refrigerant) traverses the spacers 200 to the secondary output orifice 216.

A single thermal plate 184 is shown in FIG. 6. Each thermal plate 184 has a separation sheet 191, a first cover sheet 190, and a second cover sheet 192. The first side of the thermal plate 184 is defined by the area between the first cover sheet 190 and the separation sheet 191 while the second side of the thermal plate 184 is defined by the area between the second cover sheet 192 and the separation sheet 191. As the gap between the first cover sheet 190 and the separation sheet 191 as well as the gap between the second cover sheet 192 and the separation sheet 191 are anticipated to be very small, the spacers 200 are placed there between. The spacers 200 maintain the separation between the first cover sheet 190 and the separation sheet 191 and maintain the separation between the second cover sheet 192 and the separation sheet 191. The spacers 200 on the first side of the thermal plate 184 also provide internal turbulence and force the first refrigerant to traverse a substantial area of the first side of the thermal plate 184. Likewise, the spacers 200 on the second side of the thermal plate 184 also provide internal turbulence and force the second refrigerant to traverse a substantial area of the second side of the thermal plate 184.

The first refrigerant enters the first side of the thermal plate 184 through the primary input orifice 212 and exits the first side of the thermal plate 184 through the primary output orifice 210. The second refrigerant enters the second side of the thermal plate 184 through the secondary input orifice 214 and exits the second side of the thermal plate 184 through the secondary output orifice 216. Although note required, it is preferred that the primary input orifice 212 and the secondary output orifice 216 be at a lower end of the thermal plate 184 (lower by gravity). Although note required, it is preferred that the primary input orifice 212 be at a diagonal location on the thermal plate from the primary output orifice 210 (to promote complete traversal of the first refrigerant) and the secondary output orifice 216 be at a diagonal location on the thermal plate from the secondary input orifice 214 (to promote complete traversal of the second refrigerant).

The ends of each thermal plate 184 are sealed, for example, with end plates 193/194/195/196, though any form of sealing is anticipated. For example, it is fully anticipated that the end plates 193/194/195/196 are integrally formed from either the first cover sheet 190 or the second cover sheet 192. Any method of sealing is anticipated, for example, welding and/or adhesives.

Any number of thermal plates 184 is anticipated, thereby dictating the overall volume and size of the enclosure 92, in one embodiment the thermal storage 120 is approximately three square meters in size.

The volume of thermal battery is determined by application, for example, in some embodiments, the volume is one square meter.

While the compressor(s) 40 operates, the first refrigerant in a liquid state is flows into the first side of the thermal plates 184 through a primary input orifice 212 at a lower end of the first side of the thermal plates 184 from the high pressure line 24 and heat is extracted from the material 90 within the thermal storage 120. As heat is extracted, the first refrigerant evaporates within the first side of the thermal plates 184 and the evaporated refrigerant exits into the suction tube 25 to return to the compressor(s) 40 and outside air handler 50.

The second side of the thermal plates 184 interfaces to the pump 34, an optional storage tank 60, and an inside air handler 70. When cooling is required and the pump 34 operates, the second refrigerant in a liquid state collects (e.g., by gravity) and flows out of the second side of the thermal plates 184 to the high pressure line 22 which is in fluid communication with either the pump 34 or the storage tank 60. The pump 34 forces the cold, second refrigerant into the inside air handler 70 through the high pressure line 74 where the second refrigerant evaporates as it extracts heat from air flowing through the inside air handler 70. The now gaseous second refrigerant then flows through the second suction line 72 back through a second low pressure line 26 and into the second side of the thermal plates 184 where the second refrigerant condenses due to the cold temperatures of the material 90.

The thermal plates 184 are preferably submerged or partially submerged within a material 90 and the material 90 is contained in an enclosure 92 that is preferably thermally insulated, thereby keeping cool heat stored within the material 90 from escaping to the ambient outside of the enclosure 92.

The material 90 is selected, for example, as an antifreeze and water solution of a specific concentration that will provide the desired freezing and operating temperature.

Figure 7:
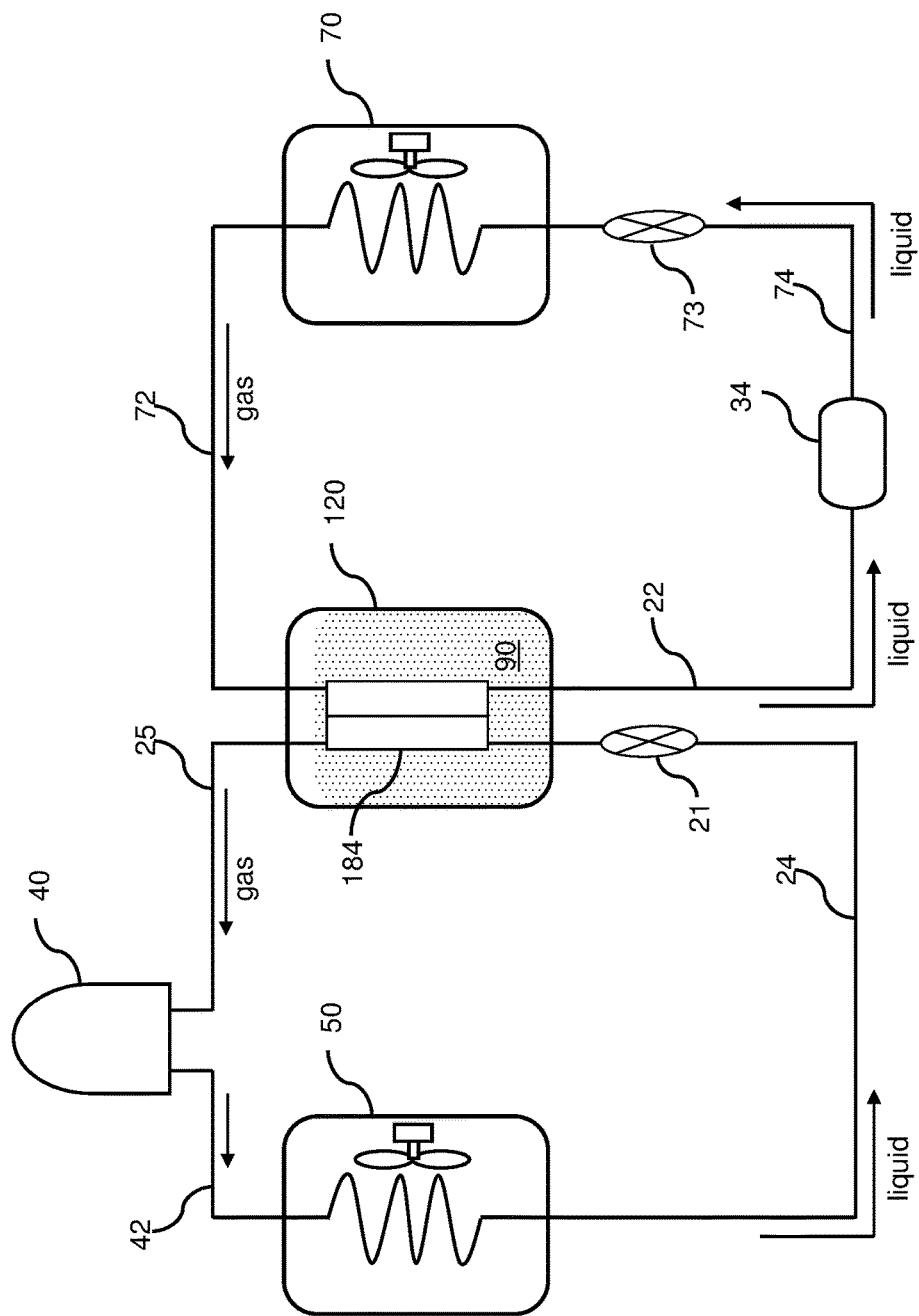
FIG. 7 illustrates a schematic view of the air conditioning system with thermal storage.
Figure 7A:
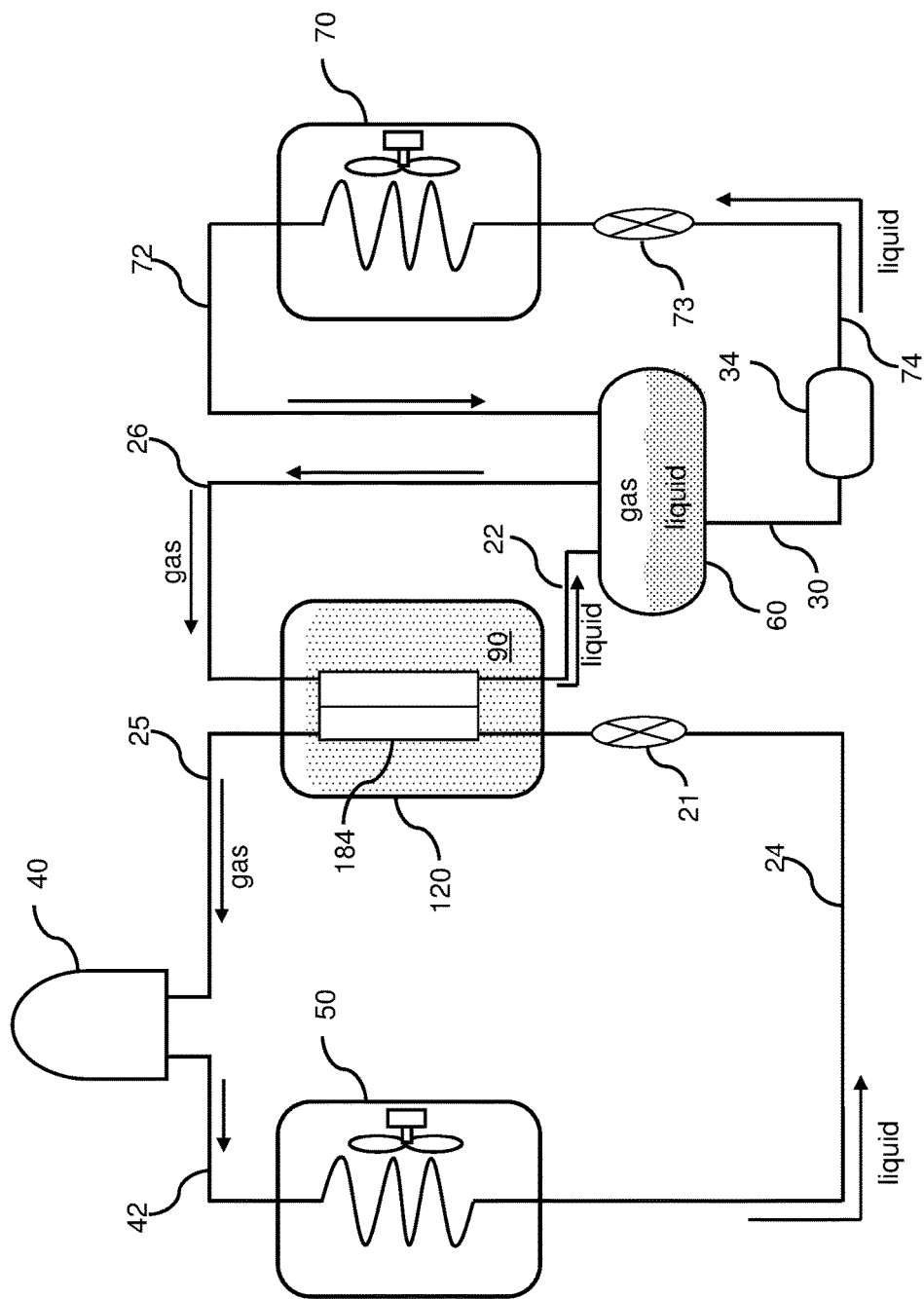
FIG. 7A illustrates a second perspective view of the air conditioning system with thermal storage.

Referring to FIGS. 7 and 7A, schematic views of an air conditioning system 10 a with thermal storage 120 are shown. In the in-line air conditioning system 10 with thermal storage 120, the thermal storage 120 is shown with one thermal plate 184 for transferring cold heat to/from a refrigerant there within, though; any number of thermal plates 184 is anticipated. The first side of the thermal plate(s) 184 is in fluid communication with the compressor(s) 40 and outside air handler 50. The second side of the thermal plate(s) 184 is in communication with the inside air handler 70 and pump 34.

In this way, two independent types and chemistries of refrigerant are allowed, though in some embodiments, the refrigerant flowing through the first side of the thermal plate(s) 184 is the same refrigerant flowing through the second side of the thermal plate(s) 184.

The air conditioning system includes thermal storage 120 as described with FIGS. 3-6. The air conditioning system includes one or more typical compressors 40. The compressor(s) 40 have a low pressure suction tube 25 (vapor inlet line) through which warm, gaseous refrigerant is received from the thermal storage 120. The compressors 40 then compress this gaseous refrigerant into a liquid state at a high pressure which is then travels through tubes 42 and through the outside air heat exchanger 50 where the liquid refrigerant is cooled by a flow of outside air over a series of fins (not shown), as known in the industry. The now cold, liquid refrigerant, under pressure, flows through the high pressure line 24 and into the thermal storage 120. As the cold, liquid refrigerant flows through the first side of the thermal plate(s) 184 within the thermal storage 120, the refrigerant changes state from a liquid to a gas (evaporates), extracting heat (thermal energy) from the material 90 within the thermal storage 120, lowering the temperature of the material 90. At a certain temperature (freezing point of the material 90 based upon the physical properties of the material 90), the material 90 changes phase from a liquid to a solid. This phase change requires cooling energy above that needed to simply lower the temperature of the material 90, and therefore, stores that additional energy until the now solid material 90 warms above a certain temperature (melting point based upon the physical properties of the material 90). For completeness, an optional thermal expansion valve 21 is shown An inside air handler 70 (coils, fins, motors not shown for clarity reasons) is located in the structure or refrigeration unit that is to be cooled such as in a living space, freezer compartment, refrigerator, vehicle passenger compartment, etc. The inside air handler 70 is similar or the same as such known in the industry.

In the example of FIG. 7, the compressor 40 is operated at a time desired (e.g. when electricity rates are lower) until the material 90 within the thermal storage 120 achieves the desired temperature. While the compressor 40 runs, cold first refrigerant from the compressor 40 and outside air handler 50 flows through the first side of the thermal plate(s) 184 within the thermal storage 120 and cools and/or freezes the material 90 within the thermal storage 120. Once the desired temperature of the material 90 within the thermal storage 120 is achieved, the compressor 40 is stopped, requiring little or no further power.

Now, as the second refrigerant in gaseous or liquid form enters the thermal storage 120, the second refrigerant contacts the cold second side of the thermal plate(s) 184 and condenses into a liquid and collects at the bottom of the second side of the thermal plate(s) 184 and into a high pressure line 22 by gravitational force.

When cooling is required within the structure as determined by, for example, a thermostat or other temperature sensing device, the condensed, liquefied second refrigerant from the thermal storage 120 is pumped from the high pressure line 22 and into the inside air handler 70 through a high pressure line 74. The inside air handler 70 receives the cooled, liquid second refrigerant through the high pressure line 74 and the liquid second refrigerant evaporates (changes state to a gas refrigerant) within the coils of the inside air handler 70, providing cool air within the structure (e.g., home, office, refrigerator). The now gaseous second refrigerant exits the inside air handler 70 through a second suction line 72 and returns to the thermal storage 120 where it is again cooled and liquefied.

Again, as the temperature of the material 90 within the thermal storage 120 rises, determinations are made as to whether the compressor 40 should be run. For example, if the outside air temperature is at an ideal temperature or if electricity rates are low, the compressor is run to cool the material 90 to the desired temperature. If the conditions are not right (e.g. electricity rates are high or outside air temperatures are not ideal), running of the compressor 40 is suppressed until cooling is no longer possible with the remaining cold heat energy stored in the thermal storage 120.

In the example of FIG. 7A, the compressor 40 is again operated at a time desired (e.g. when electricity rates are lower) until the material 90 within the thermal storage 120 achieves the desired temperature (e.g., phase changes into a solid). While the compressor 40 runs, cold first refrigerant from the compressor 40 and outside air handler 50 flows through the first side of the thermal plate(s) 184 within the thermal storage 120 and cools and/or freezes the material 90 within the thermal storage 120. Once the desired temperature of the material 90 within the thermal storage 120 is achieved, the compressor 40 is stopped, requiring little or no further power.

Now, as the second refrigerant in gaseous form enters the thermal storage 120, the second refrigerant contact the cold second side of the thermal plate(s) 184 and condenses into a liquid. The condensed, cold liquefied second refrigerant collects by gravity and flows through high pressure line 22 into a storage tank 60 (preferably insulated storage tank or a Liquid Refrigerant Receiver as known in the industry). As any of the second refrigerants within the storage tank 60 evaporate, the gaseous second refrigerant flows through the second low pressure line 26 back into the thermal storage 120 where is it then condensed as described above.

The liquefied second refrigerant within the storage tank 60 is in fluid communications with a pump 34 through a second tube 30. When cooling is required within the structure as determined by, for example, a thermostat or other temperature sensing device, the condensed, liquefied second refrigerant from the storage tank 60 is pumped into the inside air handler 70 through a high pressure line 74 and optionally, a thermal expansion valve 73 which is anticipated to be any known device including a standard expansion valve, an electronic expansion valve, a hand expansion valve, a capillary tube, etc. The inside air handler 70 receives the cooled, liquid second refrigerant through the high pressure line 74 and the liquid second refrigerant evaporates (changes state to a gas refrigerant) within the coils of the inside air handler 70. The now gaseous second refrigerant exits the inside air handler 70 through a second suction line 72 and returns to the storage tank 60, and eventually to the thermal storage 120 where it is again cooled and liquefied. Again, an optional thermal expansion valve 73 is shown for completeness.

As the temperature of the material 90 within the thermal storage 120 rises, determinations are made as to whether the compressor 40 should be run. For example, if the outside air temperature is at an ideal temperature or if electricity rates are low, the compressor is run to cool the material 90 to the desired temperature. If the conditions are not right (e.g. electricity rates are high or outside air temperatures are not ideal), running of the compressor 40 is suppressed until cooling is no longer possible with the remaining cold heat energy stored in the thermal storage 120.

In a preferred embodiment, the pump 34 is an LPA (Liquid Pressure Amplification) pump. Although a single thermal storage 120 is shown in FIGS. 1 and 2, smaller, larger, serial and/or parallel units of thermal storage 120 are anticipated.

In some embodiments, the material 90 within the thermal storage is a chemical-based antifreeze material such as ethylene glycol or a mixture of such antifreeze material and water for achieving the desired phase change temperature (e.g., freezing point). In some embodiments, the material 90 is made of a non-global warming fluid that is processed from the vegetable beetroot. There is no limitation to the material 90. By varying the antifreeze concentration level of the material 90, the antifreeze eutectic freezing level is set as desired. For example, a higher eutectic freezing temperature is used in air conditioning for chilling in the range of 25 F to 30 F, while a medium eutectic freezing temperature is used in air conditioning for chilling in refrigerators in the range of 15 to 20 F as needed for fresh meats, dairy products, and a low eutectic freezing temperature is used in air conditioning for chilling in refrigerators in the range of 35 F to −18 F, typically in freezers for frozen meats, fish, poultry, etc.

It is fully anticipated that the first refrigerant be the same or different to the second refrigerant and either refrigerant is any know refrigerant in the industry. As a first example, the first refrigerant is propane or ammonia (Nh3) and the second refrigerant is Co2 fluid (R-744). As a second example, both the first refrigerant and second refrigerant is Co2 fluid (R-744).

Figure 8:
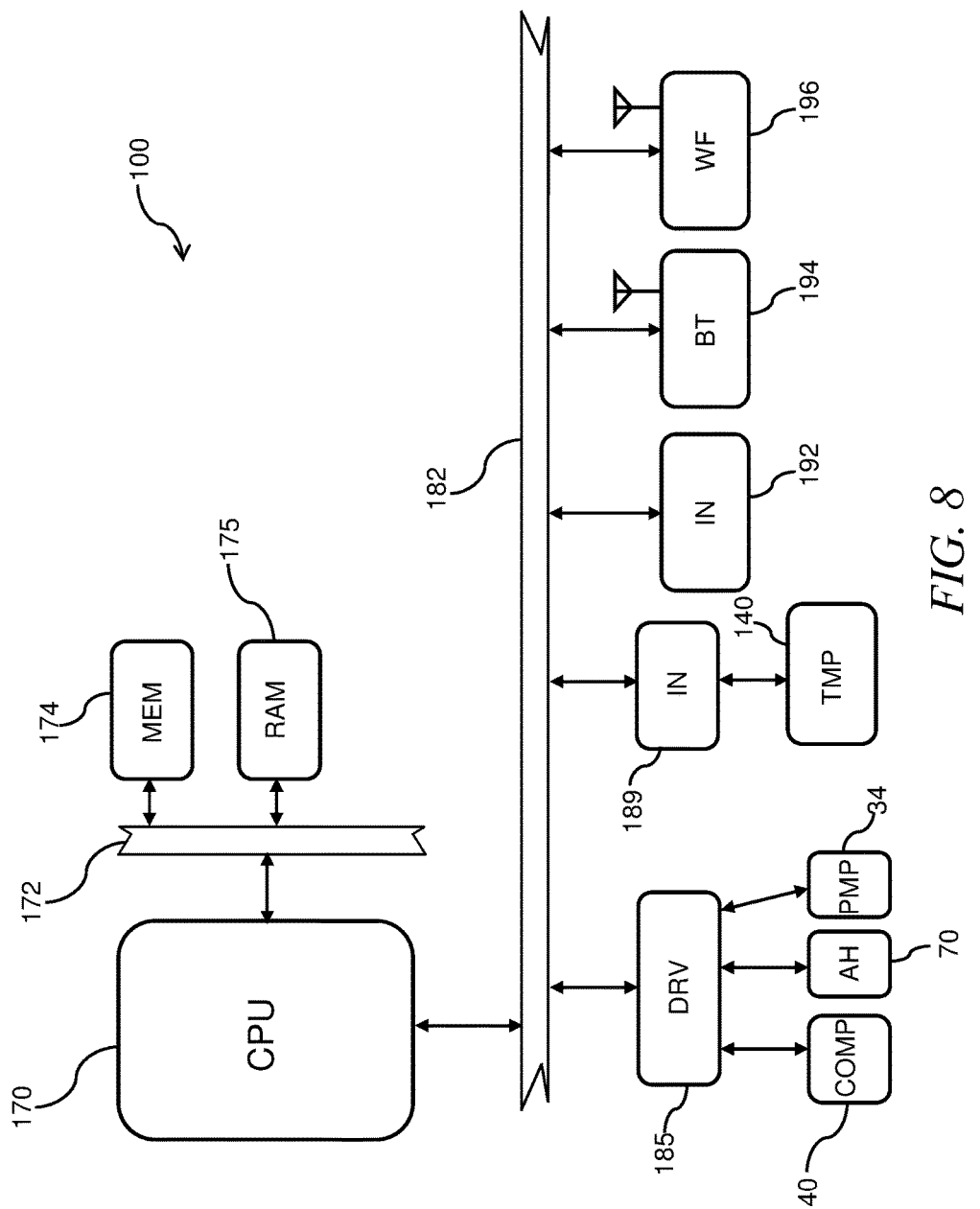
FIG. 8 illustrates a schematic view of an exemplary processing device as used in conjunction with the air conditioning system with thermal storage.

Referring to FIG. 8, a schematic view of an exemplary processing device 100 as used within the air conditioning system 10 with thermal storage 120 is shown. The exemplary processing device 100 represents a typical processor system as used with the air conditioning system 10 with thermal storage 120, though it is known in the industry to utilize logic in place of processors and vice versa. This exemplary processing device 100 is shown in its simplest form. Different architectures are known that accomplish similar results in a similar fashion and the air conditioning system 10 with thermal storage 120 is not limited in any way to any particular system architecture or implementation. In this exemplary processing device 100, a processor 170 executes or runs programs from a random access memory 175. The programs are generally stored within a persistent memory 174 and loaded into the random access memory 175 when needed. The processor 170 is any processor, typically a processor designed for portable devices. The persistent memory 174, random access memory 175 interfaces through, for example, a memory bus 172. The random access memory 175 is any memory 175 suitable for connection and operation with the selected processor 170, such as SRAM, DRAM, SDRAM, RDRAM, DDR, DDR-2, etc. The persistent memory 174 is any type, configuration, capacity of memory 174 suitable for persistently storing data, for example, flash memory, read only memory, battery-backed memory, magnetic memory, etc. In some exemplary processing devices 100, the persistent memory 174 is removable, in the form of a memory card of appropriate format such as SD (secure digital) cards, micro SD cards, compact flash, etc.

Also connected to the processor 170 is a system bus 182 for connecting to peripheral subsystems such as output drivers 185 and inputs 189/192 such as inputs from a temperature sensor 140 or other controls, etc. The output drivers 185 receive commands from the processor 170 and control the operation of the various components of the air conditioning system 10 with thermal storage 120, for example, the compressor 40, the inside air handler 70 and the pump 34.

In general, some portion of the memory 174 is used to store programs, executable code, and data. In some embodiments, other data is stored in the memory 174 such as tables and settings, etc.

The peripherals and sensors shown are examples and other devices are known in the industry such as Global Positioning Subsystems, speakers, microphones, USB interfaces, Bluetooth transceivers 94, Wi-Fi transceivers 96, image sensors, temperature sensors, etc., the likes of which are not shown for brevity and clarity reasons.

In some embodiments, the exemplary processing device 100 interfaces to a wireless transmitter or transceiver (e.g., Bluetooth radio transceiver 94, a Wi-Fi radio transceiver 96, or both) for communication with local wireless devices such as personal computers and wireless sensors/thermostats.

Figure 9:
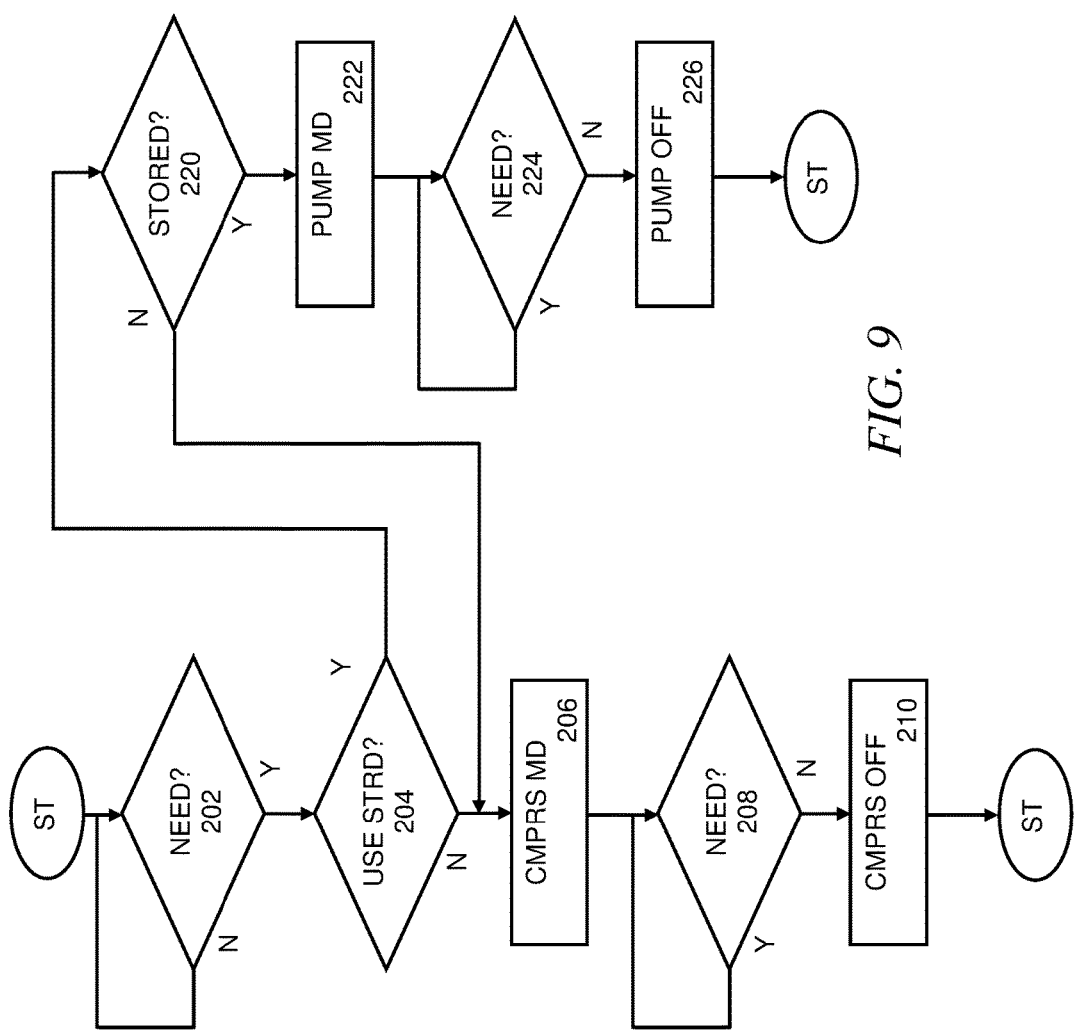
FIG. 9 illustrates a flow chart of an exemplary software system running on processing device as used in conjunction with the air conditioning system with thermal storage.

Referring to FIG. 9, a flow chart of an exemplary software system running on processing device 100 as used in conjunction with the air conditioning system 10 with thermal storage 120 is shown.

In this exemplary flow, the system 10 waits 202 until there is a need for cooling (e.g., a temperature within the structure being cooled rises above a programmed temperature as measured by a temperature sensor 140). Once the need for cooling is determined 202, a test 204 is made to determine if it is better to use stored cold heat or to capture cold heat from the outside ambient air. As an example, it is better to use stored cold heat when the outside ambient air temperature is above a certain point or when energy rates (e.g. electricity costs) are high (e.g., in areas in which rates vary by time-of-day). If the test 204 concludes that it is best to use stored cold heat, another test 220 is performed to determine is sufficient cold heat is available in the thermal storage 120. If either the test 204 determines that it is better to use stored cold heat or the test 220 determines there is not sufficient cold heat is available in the thermal storage 120, the compressor 40, outside air handler 50, and inside air handler 70 are operated 206 until the need for cooling abates 208 (e.g., a temperature within the structure being cooled goes below above a second programmed temperature as measured by a temperature sensor 140), at which time the compressor 40, outside air handler 50, and inside air handler 70 are shut off.

If the second test 220 determines that there is sufficient cold heat is available in the thermal storage 120, instead of operating the compressor 40, the pump 34 and inside air handler 70 are turned on 222 and operate until it is determined 224 that the need for cooling has stopped (e.g., a temperature within the structure being cooled goes below above a second programmed temperature as measured by a temperature sensor 140), at which time the pump 34 and inside air handler 70 are turned off 226.

Note, flows shown are examples, as it is known to include additional steps to sequence operations (e.g., starting the fans in the air handlers 50/70 before starting the compressor 40) and delaying operation of the compressor 40 for a period of time after the compressor 40 is stopped to prevent failures. It is also anticipated that any system based on a processor 100 is equally feasible implemented as logic, for example, in a logic array, etc.

Although described in the above examples as a system for cooling, it is known to reverse such systems and the described examples operate in reverse as expected.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An air conditioning system comprising:
a compressor;
an outside air handler in fluid communications with the compressor;
a thermal storage having thermal plates, the thermal plates having a first cover sheet separated from a separation sheet and a second cover sheet at an opposing side of the separation sheet and separated from the separation sheet, a primary input orifice of the first cover sheet of thermal plates is in fluid communications with the outside air handler and a primary output orifice on the first cover sheet of thermal plates is in fluid communications with the compressor;
an inside air handler has an input and an output; and
a fluid pump has a pump input and a pump output, the pump input is in fluid communications with a secondary output orifice on the second cover sheet of thermal plates and the pump output is in fluid communications with the input of the inside air handler, the output of the inside air handler in fluid communications with a secondary input orifice on the second cover sheet of thermal plates;
edges of the first cover sheet are fluidly sealed to edges of the separation sheet and edges of the second cover sheet are fluidly sealed to the edges of the separation;
whereas when the compressor runs, a first refrigerant is compressed into a liquid, cooled by the outside air handler and flows into the primary input orifice of the first side of thermal plates where the first refrigerant then evaporates, extracting heat from a material within the thermal storage and the evaporated refrigerant returns to the compressor, and
whereas when cooling is needed, the pump operates and circulates a second refrigerant from the secondary output orifice of the second side of thermal plates into the inside air handler where the second refrigerant extracts heat as it evaporates into a gas and the refrigerant in gaseous form returns to the thermal storage where the second refrigerant condenses back into a cold liquid.

2. The air conditioning system of claim 1, wherein the first refrigerant and the second refrigerant are the same.

3. The air conditioning system of claim 1, wherein the material is a mixture of antifreeze and water.

4. The air conditioning system of claim 1, wherein the material is a fluid that is derived from vegetable beetroot.

5. The air conditioning system of claim 1, wherein each of the thermal plates comprises a first sheet of metal, a separation sheet of metal, and a second sheet of metal and a seal around the edges of the first sheet of metal, the second sheet of metal, and the separation sheet of metal; the primary input orifice and the primary output orifice are in fluid communications with a first gap area between the first sheet of metal and the separation sheet of metal; and the secondary input orifice and the secondary output orifice are in fluid communications with a second gap area between the second sheet of metal and the separation sheet of metal.

6. The air conditioning system of claim 5, further comprising a first plurality of spacers between the first sheet of metal and the separation sheet of metal.

7. The air conditioning system of claim 6, further comprising a second plurality of the spacers between the second sheet of metal and the separation sheet of metal.

8. The air conditioning system of claim 1, further comprising a storage tank, the storage tank inserted between the thermal storage and the pump such that, as the second coolant condenses within the second set of heat transfer tubes, the second coolant, in liquid form, flows into the storage tank to be pumped out of the storage tank by the pump when needed.

9. The air conditioning system of claim 1, wherein the thermal storage is enclosed in a container and submerged in the material, the enclosure is thermal insulated and provides a seal for preventing loss of the material and provides thermal insulation.

10. A method of cooling comprising:
cooling and compressing a first refrigerant into a liquid state using a compressor and outside air handler;
flowing the first refrigerant in the liquid state through an input orifice of a first side of one or more thermal plates, the first side of one or more thermal plates interfaced to and separated from a second side of one or more thermal plates by a sheet of metal, the thermal plate(s) being situated within a thermal storage that is at least partially filled with a material;
a primary input orifice of the first side of thermal plates is in fluid communications with the outside air handler and primary output orifice of the first side of thermal plates is in fluid communications with the compressor;
extracting heat from the material by the first refrigerant as the first refrigerant changes state from the liquid into a gas within the first side of the thermal plate(s);
the first refrigerant, in gaseous form, exiting the first side of the thermal plate(s) through a primary output orifice of the first side of thermal plates for returning to the compressor; and
flowing a second refrigerant through an inside air handler, the second refrigerant in liquid form extracts heat from air flowing through the inside air handler, thereby evaporating the second refrigerant;
flowing the second refrigerant after evaporation into the second side of the thermal plate(s) through a secondary input orifice; and
cooling the second refrigerant within the second side of the thermal plates, the second refrigerant exiting the second side of the thermal plate(s) through a secondary exit orifice for returning to the inside air handler.

11. The method of claim 10, wherein the step of flowing the second refrigerant is performed by a liquid pump.

12. The method of claim 10, wherein the first refrigerant is the same as the second refrigerant.

13. The method of claim 10, wherein the steps of cooling and flowing the first refrigerant are performed at a different time than the step of flowing the second refrigerant.

14. An air conditioning thermal storage comprising:
one or more thermal plates, the one or more thermal plates having a first side and a second side, the first side of each of the one or more thermal plates has a first cover sheet having therein a primary input orifice and a primary output orifice, the second side of each of the one or more thermal plates has a second cover sheet having therein a secondary input orifice and a secondary output orifice;
the first side of each of the one or more thermal plates is fluidly isolated from the second side of each of the one or more thermal plates by a separation sheet, while the first side of each of the one or more thermal plates is in thermal conduction with the second side of each of the one or more thermal plates by way of the separation sheet;
the edges of the first cover sheet and the separation sheet are sealed except for the primary input orifice and the primary output orifice for preventing leakage; and
the edges of the second cover sheet and the separation sheet are sealed except for the secondary input orifice and the secondary output orifice for preventing leakage.

15. The air conditioning thermal storage of claim 14, wherein the separation sheet is a sheet of metal.

16. The air conditioning thermal storage of claim 14, wherein the first cover sheet is separated from the separation sheet by a plurality of spacers and the second cover sheet is separated on an opposing side from the separation sheet by a second plurality of the spacers.

17. The air conditioning thermal storage of claim 14, wherein the one or more thermal plates are at least partially immersed in a material.

18. The air conditioning thermal storage of claim 17, wherein the material is vegetable beetroot.

19. The air conditioning thermal storage of claim 17, wherein the one or more thermal plates and the material are housed in a thermally insulated enclosure.

* * * * *